No. 863,003. PATENTED AUG. 13, 1907.
E. H. SHORMAN.
AUTOMATIC WEIGHING APPLIANCE.
APPLICATION FILED MAR. 20, 1907.
2 SHEETS—SHEET 1.
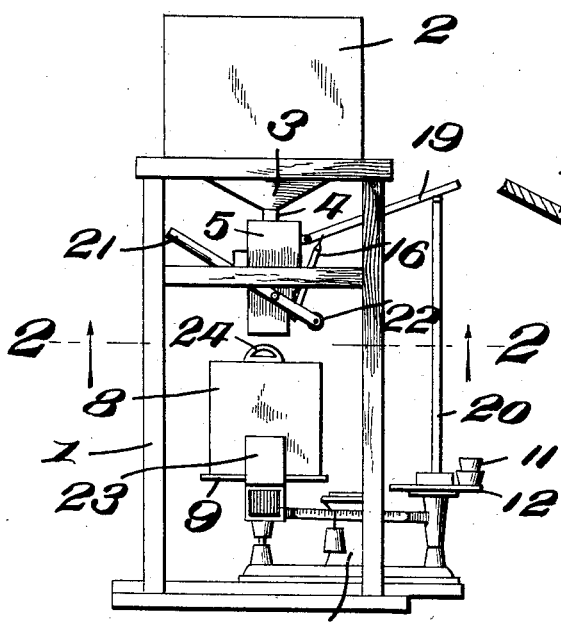
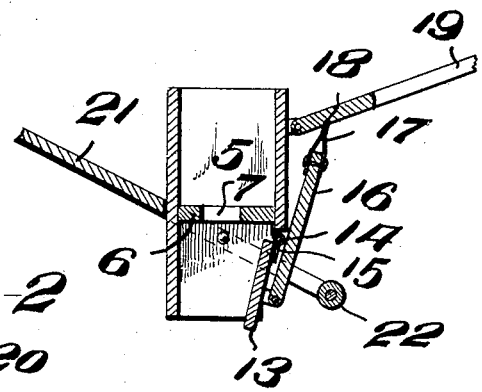
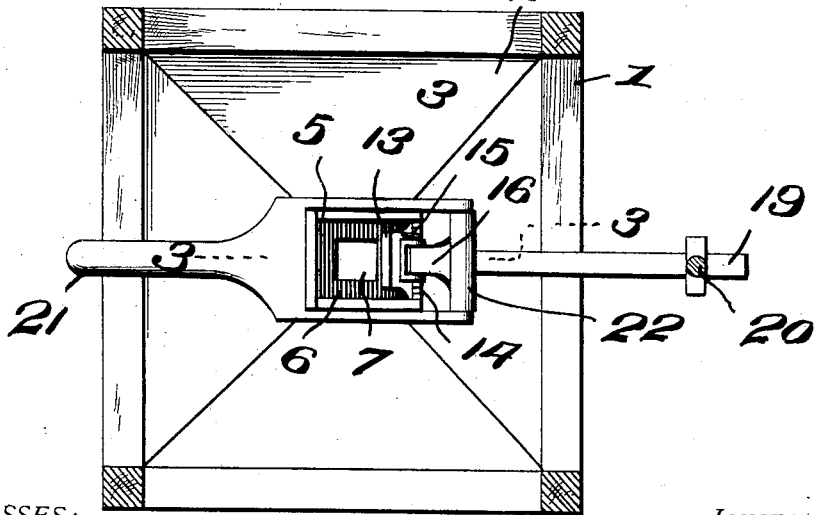
WITNESSES:
INVENTOR
E. H. Shorman
BY W. J. FitzGerald Jr.
Attorneys

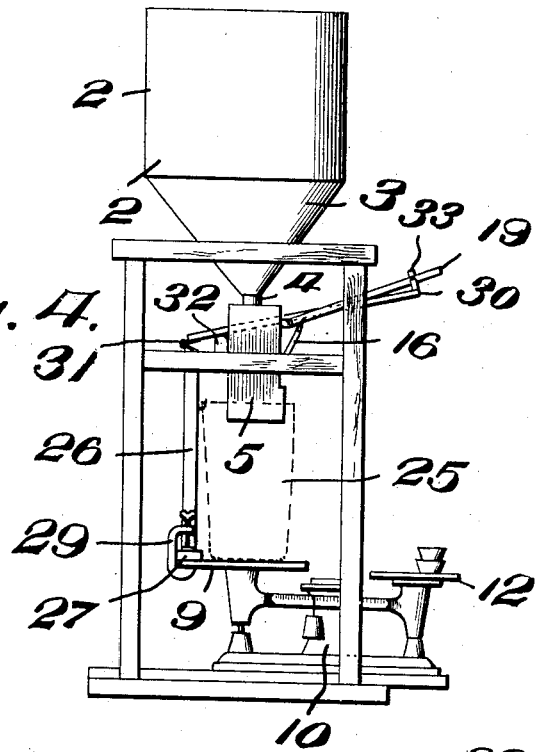
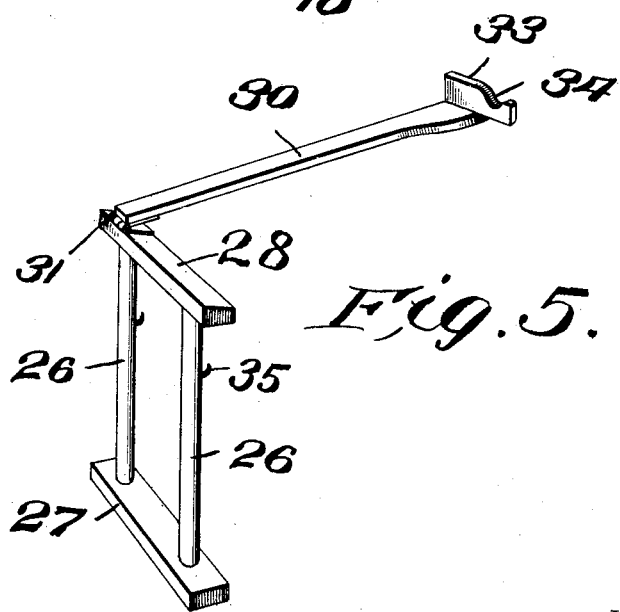

UNITED STATES PATENT OFFICE.

EDGAR H. SHORMAN, OF MARION, IOWA.

AUTOMATIC WEIGHING APPLIANCE.

No. 863,003.  Specification of Letters Patent.  Patented Aug. 13, 1907.

Application filed March 20, 1907. Serial No. 363,420.

*To all whom it may concern:*

Be it known that I, EDGAR H. SHORMAN, a citizen of the United States, residing at Marion, in the county of Linn and State of Iowa, have invented certain new and useful Improvements in Automatic Weighing Appliances; and I do hereby declare the following to be a full, clear, and exact description of the invention, such as will enable others skilled in the art to which it appertains to make and use the same.

My invention relates to new and useful improvements in automatic weighing appliances and more particularly to that class adapted to be used for weighing grain products or the like and my object is to provide a pair of scales and place thereon a receptacle to receive the grain products and weigh the same.

A further object is to provide an automatically operated door to stop the flow of the grain products when a certain quantity of the same has been deposited in the receptacle.

A still further object is to provide means for holding the door in its opened position and a still further object is to provide releasing means for the door holding mechanism whereby the door will be released coincident to the operation of the scales.

Other objects and advantages will be hereinafter referred to and more particularly pointed out in the claims.

In the accompanying drawings, which are made a part of this application, Figure 1 is a side elevation of my improved form of weighing mechanism showing the same in position as when the grain products are being deposited in the receptacle. Fig. 2 is a sectional view as seen on line 2—2 Fig. 1. Fig. 3 is a detail sectional view as seen on line 3—3 Fig. 2. Fig. 4 is a side elevation of the weigher, showing a slightly modified form of door operating mechanism, and, Fig. 5 is a detail perspective view of the trigger employed for operating the same.

Referring to the drawings in which similar reference numerals designate corresponding parts throughout the several views, 1 indicates a frame to the upper end of which is secured a hopper 2, into which is adapted to be disposed a quantity of the substance to be weighed, the floor 3 of said hopper converging to a common center and is provided with an outlet pipe 4.

The contents of the hopper 2 passes through the outlet pipe 4 into a chute 5, said chute being provided in its length with a floor section 6 in the central portion of which is an opening 7 through which the product passes into a receptacle 8. The receptacle 8 is placed upon one platform 9 of a balance scale 10 and by placing a predetermined number of weights 11 on the opposite platform 12 of the scale it will be seen that a certain quantity of the product will be deposited in the receptacle before the weight of the product will overcome the weights 11 upon the platform 12 and cause the platform 9 to descend and the platform 12 to ascend. It will therefore be seen that by placing certain weights upon one platform and the receptacle upon the opposite platform that the product may be readily weighed and in order to stop the flow of the product after a predetermined quantity has been deposited in the receptacle, I provide a swinging door 13 which is hingedly secured to one wall of the chute at a point below the floor section 6 so that when said door is elevated the opening 7 will be closed and the product prevented from descending into the receptacle and in order to quickly dispose the door over the opening I direct around the hinge 14, a coiled spring 15, the tension of the spring being sufficient to elevate the door 13 and hold the same against the pressure of the product in the chute.

In order to hold the door 13 in its opened position so that the grain products will pass into the receptacle 8, I hingedly secure to the lower face of the door 13, an arm 16, the upper end of which is provided with a finger 17 which is adapted to enter a notch 18 in a trigger 19, said trigger being pivotally secured to one face of the chute 5, and extends laterally therefrom, the notch 18 being adjacent the pivotal point of the trigger so that the weight of the trigger beyond the notch will cause the trigger to firmly engage the finger and hold the door 13 in its opened position.

A standard 20 is disposed between the outer end of the trigger 19 and the platform 12 so that when the platform 12 is in its lowered position, the trigger 19 will rest in engagement with the finger 17, as soon, however, as a sufficient quantity of the grain product has passed into the receptacle 8 to overcome the weights 11, the ascending platform 12 will elevate the standard which will result in freeing the finger 17 from the notch 18 and allow the door 13 to be closed by the spring 15.

To enable me to readily open the door 13, I provide a bifurcated lever 21 which is pivotally secured to the chute 5 and adjacent the lower end thereof, the extreme outer ends of the bifurcated portion extending beyond that side of the chute upon which is disposed the trigger 19 and has mounted therebetween a roller 22, said roller being in the path of the arm 16 so that when the trigger is elevated the arm 16 will descend and rest upon the roller 22 and it will be seen that by depressing the handle portion of the lever, the door 13 will be swung open and the finger 17 again directed into engagement with the notch 18. It will thus be seen that by varying the weights 11 upon the platform 12 that the quantity of grain product to be deposited in the receptacle 8 will be varied and as soon as a sufficient quantity of the grain products have been deposited in the receptacle to overcome the weights, the door 13 will be released and allowed to close and remains in this position until the grain products have been removed from the receptacle and the door again opened.

In order to readily remove the contents of the receptacle without lifting the receptacle from the platform 9, I provide a spout 23 which is attached to one face of the receptacle and at the lower end thereof, said spout being inclined so that the contents of the receptacle will readily flow therethrough and in order to hold the grain products from passing through the spout until such time as it is desired to empty the receptacle, I provide a sliding closure 24 which is disposed within the receptacle and adapted to normally rest over the upper end of the spout.

In Figs. 4 and 5 of the drawing, I have shown a slightly modified form of device in that the receptacle 8 is dispensed with and a bag 25 disposed below the lower end of the chute 5 to catch the descending grain products and I have also shown a slightly modified form of means for operating the trigger 19 and in this instance I secure to the platform 9, a pair of standards 26 which are held in alinement with each other by means of blocks 27 and 28 at the lower and upper ends thereof, respectively, and the standards are secured to the platform 9 in any preferred manner by means of a clamp 29.

Secured to the block 28 and adjacent one end thereof is a trip arm 30, said trip arm being secured to the block 28 by means of a hinge 31 while the free end of the trip arm is directed over a reach bar 32 carried by a portion of the frame 1, said reach bar forming a fulcrum for the trip arm when the standards are moved upwardly and downwardly by the action of the scales. The extreme free end of the trip arm 30 is provided with a latch 33 which extends to one side of the trip arm and is provided with a depression 34 in which the outer end of the trigger 19 is adapted to rest so that when the platform 9 is depressed, the outer end of the trigger 19 will be elevated to release the finger 17 from the notch 18 in the trigger and allow the door 13 to close.

For convenience in holding the mouth of the bag in juxtaposition to the lower end of the chute 5, I secure hooks 35 to the standards 26 so that by directing the mouth of the bag around the lower end of the chute 5 and into engagement with the hooks 35, the bag will be held open to receive the contents of the chute and positively supported upon the platform 9.

In operation the hopper 2 is filled with the article to be weighed and a portion of the contents of the hopper will descend into the chute 5 and fill the same, the flow of the contents of the hopper being stopped as soon as the chute has become sufficiently filled to surround the depending end of the outlet pipe 4. As soon as it is desired to weigh a certain amount of the contents of the hopper the door 13 is opened and the arm pivotally secured thereto, directed into engagement with the trigger to hold the door open. Previous to opening the door, however, one or more weights, determined by the amount of the product to be weighed, is placed upon the platform 12 so that when enough of the product has descended into the receptacle to overcome the weights placed upon the platform 12, the receptacle end of the scale beam will descend and that end of the beam containing the weights will ascend which will result in operating the trigger and releasing the door 13 whereupon the spring 15 will dispose the door over the opening 7 and stop the flow of the product through the chute 5.

The operation of the device shown in Fig. 4 is slightly different in that the descending of the platform 9 will elevate the free end of the trip arm 30 and operate the trigger 19, the standards in this instance being secured to the platform 9 instead of to the platform 12. As soon as the product has been weighed, the same is removed from the platform 9 so that the weights will again cause the platform 12 to descend and raise the platform 9 to its initial position and by again opening the door 13 the weighing operation is repeated.

It will now be seen that I have provided a very cheap and accurate device for automatically weighing various articles and one not requiring an attendant after the same has been set in operation and while I have shown and described the same as employed for weighing smaller quantities of different products it will be readily understood that the same may be employed for weighing the articles in larger quantities.

What I claim is:

1. In a weighing device the combination with a pair of scales having a platform at each end thereof; of a receptacle adapted to rest upon one of said platforms, a hopper above said receptacle, a chute between said hopper and receptacle, a floor in said chute having an opening therein, a closure for said opening, means to automatically dispose said closure over the opening, an arm pivotally secured to said closure, a trigger pivotally secured to said chute and having a notch therein adapted to receive the upper end of said arm and hold the closure in its opened position, and means between said trigger and scales to elevate said trigger and release the arm when the scales are operated to weigh the contents of the receptacle.

2. In a weighing device the combination with a pair of scales; of a receptacle adapted to be mounted on one end of said scales, a hopper adapted to hold articles to be weighed, a chute below said hopper and in juxtaposition to the lower end thereof, a floor in said chute having an opening therethrough, a door hingedly secured to one wall of said chute and adapted to extend over said opening, means to automatically direct said door over the opening, an arm pivotally secured to said door, a finger at the upper end of said arm, a trigger secured to the chute having a notch therein to receive said finger whereby the door will be held in its opened position, a standard disposed between the outer end of said trigger and one end of the scales whereby when a predetermined quantity of the article to be weighed has descended from the chute into the receptacle the trigger will be elevated and the arm released and the door disposed over the opening in the floor of the chute.

In testimony whereof I have signed my name to this specification in the presence of two subscribing witnesses.

EDGAR H. SHORMAN.

Witnesses:
GEO. W. TODD,
EDWIN GARRETSON.